United States Patent
Wang

(10) Patent No.: US 11,436,254 B2
(45) Date of Patent: Sep. 6, 2022

(54) KVM, AND FOLDER ONE-KEY MOUNTING METHOD, DEVICE, APPARATUS AND MEDIUM APPLIED IN KVM

(71) Applicant: ZHENGZHOU YUNHAI INFORMATION TECHNOLOGY CO., LTD., Henan (CN)

(72) Inventor: Xuelong Wang, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 611 days.

(21) Appl. No.: 16/475,095

(22) PCT Filed: Jun. 19, 2018

(86) PCT No.: PCT/CN2018/091775
§ 371 (c)(1),
(2) Date: Jun. 30, 2019

(87) PCT Pub. No.: WO2019/227536
PCT Pub. Date: Dec. 5, 2019

(65) Prior Publication Data
US 2021/0334291 A1    Oct. 28, 2021

(30) Foreign Application Priority Data
May 31, 2018 (CN) .......................... 201810548589.7

(51) Int. Cl.
G06F 16/27    (2019.01)
G06F 16/23    (2019.01)
(Continued)

(52) U.S. Cl.
CPC .......... *G06F 16/273* (2019.01); *G06F 3/0604* (2013.01); *G06F 3/0653* (2013.01);
(Continued)

(58) Field of Classification Search
CPC .. G06F 16/273; G06F 16/2379; G06F 3/0604; G06F 3/0653; G06F 3/0659; G06F 3/0673; G06F 13/4022
(Continued)

(56) References Cited

U.S. PATENT DOCUMENTS

| | | | | |
|---|---|---|---|---|
| 2006/0253669 A1* | 11/2006 | Lobdell | ............... | G06F 11/1464 711/162 |
| 2009/0094395 A1* | 4/2009 | Shen | ....................... | G06F 3/023 710/74 |
| 2017/0124114 A1* | 5/2017 | Zhang | ................. | G06F 9/45558 |

FOREIGN PATENT DOCUMENTS

| | | |
|---|---|---|
| CN | 104850442 A | 8/2015 |
| CN | 108256059 A | 7/2018 |

OTHER PUBLICATIONS

The 1st Office Action regarding Chinese Patent Application No. CN201810548589.7, dated Nov. 8, 2019. English Translation Provided by http://globaldossier.uspto.gov.
(Continued)

*Primary Examiner* — Joshua Bullock
(74) *Attorney, Agent, or Firm* — Yue (Robert) Xu; Apex Attorneys at Law, LLP

(57) ABSTRACT

A folder one-key mounting method includes: determining a size of a target folder when a one-key mounting instruction for the target folder is obtained; determining a size of a mirror image file based on the size of the target folder; determining a storage path of the mirror image file based on the size of the mirror image file; generating a target mirror image file corresponding to the target folder and the size of the mirror image file, and storing the target mirror image file in a position corresponding to the storage path; and mounting the target mirror image file to a server.

17 Claims, 6 Drawing Sheets

(51) Int. Cl.
    *G06F 3/06* (2006.01)
    *G06F 13/40* (2006.01)
(52) U.S. Cl.
    CPC .......... *G06F 3/0659* (2013.01); *G06F 3/0673* (2013.01); *G06F 13/4022* (2013.01); *G06F 16/2379* (2019.01)
(58) Field of Classification Search
    USPC ........................................................ 707/613
    See application file for complete search history.

(56) References Cited

OTHER PUBLICATIONS

International Search Report for PCT/CN2018/091775 dated Mar. 6, 2019, ISA/CN.

* cited by examiner

Traverse each file in the target folder to determine a size of each file and accumulate the size of each file to obtain the size of the target folder, when a one-key mounting instruction for the target folder is obtained — S21

Determine a value of N based on the size of the target folder with $2^N$GB being greater than or equal to the size of the target folder and determine $2^N$GB as the size of the mirror image file — S22

Determine a remaining storage capacity of a disk where a preset path is located, determine whether the remaining storage capacity of the disk where the preset path is located is greater than the size of the mirror image file — S23

Determine the preset path as the storage path of the mirror image file, in a case that the remaining storage capacity of the disk where the preset path is located is greater than the size of the mirror image file. Select, from paths other than the preset path, a path located in a disk having a remaining storage capacity greater than the size of the mirror image file as the storage path of the mirror image file, in a case that the remaining storage capacity of the disk where the preset path is located is not greater than the size of the mirror image file — S24

Generate a target mirror image file corresponding to the target folder and the size of the mirror image file — S25

Store the target mirror image file in a position corresponding to the storage path and mount the target mirror image file to a server — S26

Figure 2

KVM, AND FOLDER ONE-KEY MOUNTING METHOD, DEVICE, APPARATUS AND MEDIUM APPLIED IN KVM

The present application is a national phase application of PCT international patent application PCT/CN2018/091775, filed on Jun. 19, 2018 which claims the priority to Chinese Patent Application No. 201810548589.7, titled "KVM, AND FOLDER ONE-KEY MOUNTING METHOD, DEVICE, APPARATUS AND MEDIUM APPLIED IN KVM", filed on May 31, 2018 with the China National Intellectual Property Administration, both of which are incorporated herein by reference in their entireties.

TECHNICAL FIELD

The present disclosure relates to the computer technology field, and in particular, to a KVM, a folder one-key mounting method, a folder one-key mounting device, a folder one-key mounting apparatus and a medium applied in the KVM.

BACKGROUND

KVM (K represents Keyboard, V represents Video, and M represents Mouse, KVM is also known as multi-computer switcher) technology aims to realize centralized management of systems and networks by configuring appropriately a keyboard, a mouse and a display, and to achieve effects of improving manageability of a system, increasing work efficiency of a system administrator, cutting an area of a computer room, lowering a cost of owning a network project and a server system, creating a healthy and environmental computer room by avoiding electromagnetic radiation from multiple displays, or the like. By utilizing the KVM, the system administrator may switch between multiple host computers or servers having different operating systems and manage the multiple host computers or servers with a keyboard, a mouse and a display. The servers may be controlled by the KVM remotely.

A function of mounting a folder is provided by the KVM for better utilizing various kinds of resources on a client. The function of mounting a folder is to mount a folder on a client to a server with the KVM. And the server may access the folder and any files in the folder just like accessing a local path. In the conventional technology, the function of mounting a folder with the KVM is realized by setting a size parameter and a path parameter manually by an operator, to designate a size for a temporary mirror image file generated subsequently and to designate a local path for a user to store the mirror image file. A temporary mirror image file with a designated size is generated in the local path of the client, and a target folder of the mirror image file is mounted to the server. That is, the size parameter and the path parameter should be set manually by the operator in the conventional technology, and thus it is inconvenient to operate for a user and may easily result in errors in operation, especially for a user who is not professional enough to know the specific meaning of the size parameter and the path parameter.

SUMMARY

In view of the above, the present disclosure aims to provide a KVM, a folder one-key mounting method, a folder one-key mounting device, a folder one-key mounting apparatus and a medium applied in the KVM, which can simplify user operations during a process of mounting a folder with a KVM, decrease misoperation of the user and improve user experience.

In a first aspect, a folder one-key mounting method applied in a KVM is provided according to the disclosure. The method includes:

determining a size of a target folder when a one-key mounting instruction for the target folder is obtained;

determining a size of a mirror image file based on the size of the target folder;

determining a storage path of the mirror image file based on the size of the mirror image file;

generating a target mirror image file corresponding to the target folder and the size of the mirror image file, and storing the target mirror image file in a position corresponding to the storage path; and mounting the target mirror image file to a server.

Optionally, the determining a size of a target folder includes:

traversing each file in the target folder, to determine a size of each file; and accumulating the size of each file, to obtain the size of the target folder.

Optionally, the determining a size of a target folder includes:

searching a preset information table for the size of the target folder, where the preset information table stores in advance an identifier of each folder and a size of each folder.

Optionally, the folder one-key mounting method further includes:

monitoring a variation of a file in each folder in a real time manner; and when a variation of a file in a folder occurs, collecting variation information of the file and updating the information table based on the variation information of the file.

Optionally, the determining a size of a mirror image file based on the size of the target folder includes:

determining a value of N based on the size of the target folder with $2^N$GB being greater than or equal to the size of the target folder, where N is a non-negative integer; and determining $2^N$GB as the size of the mirror image file.

Optionally, the determining a value of N based on the size of the target folder includes:

determining the value of N to be 0 in a case that the size of the target folder is not greater than 1 GB; and determining the value of N to be a value meeting $2^{N-1}$GB$<S\leq 2^N$GB in a case that the size of the target folder is greater than 1 GB, where S represents the size of the target folder.

Optionally, the determining a storage path of the mirror image file based on the size of the mirror image file includes:

determining multiple storage paths of the mirror image file based on the size of the mirror image file; and the storing the target mirror image file in a position corresponding to the storage path and mounting the target mirror image file to a server includes:

storing the target mirror image file in a position corresponding to each of the multiple storage paths, and mounting the target mirror image files stored in positions corresponding to the multiple storage paths to different servers respectively.

Optionally, the determining a storage path of the mirror image file based on the size of the mirror image file includes:

selecting, from all paths, a path located in a disk having a remaining storage capacity greater than the size of the mirror image file as the storage path of the mirror image file.

Optionally, the selecting, from all paths, a path located in a disk having a remaining storage capacity greater than the size of the mirror image file as the storage path of the mirror image file includes:

determining a secret level of each path and a remaining storage capacity of a disk where each path is located;

selecting, from all paths, a path located in a disk having a remaining storage capacity greater than the size of the mirror image file, to obtain a preliminary path set; and selecting, from the preliminary path set, a path having a secret level which is the same as a level of the server as the storage path of the mirror image file.

Optionally, the selecting, from all paths, a path located in a disk having a remaining storage capacity greater than the size of the mirror image file as the storage path of the mirror image file includes:

determining a historical access frequency of each path and a remaining storage capacity of a disk where each path is located;

selecting, from all paths, a path located in a disk having a remaining storage capacity greater than the size of the mirror image file, to obtain a preliminary path set; and selecting, from the preliminary path set, a path having a lowest historical access frequency as the storage path of the mirror image file.

Optionally, the selecting, from all paths, a path located in a disk having a remaining storage capacity greater than the size of the mirror image file as the storage path of the mirror image file includes:

determining a secret level and a historical access frequency of each path and a remaining storage capacity of a disk where each path is located;

selecting, from all paths, a path located in a disk having a remaining storage capacity greater than the size of the mirror image file, to obtain a first preliminary path set;

selecting, from the first preliminary path set, a path having a secret level which is the same as a level of the server, to obtain a second preliminary path set; and selecting, from the second preliminary path set, a path having a lowest historical access frequency as the storage path of the mirror image file.

Optionally, the determining a storage path of the mirror image file based on the size of the mirror image file includes:

determining a remaining storage capacity of a disk where a preset path is located;

determining whether the remaining storage capacity of the disk where the preset path is located is greater than the size of the mirror image file;

determining the preset path as the storage path of the mirror image file in a case that the remaining storage capacity of the disk where the preset path is located is greater than the size of the mirror image file; and selecting, from paths other than the preset path, a path located in a disk having a remaining storage capacity greater than the size of the mirror image file as the storage path of the mirror image file, in a case that the remaining storage capacity of the disk where the preset path is located is not greater than the size of the mirror image file.

Optionally, the preset path is a home path of a current user.

Optionally, the selecting, from paths other than the preset path, a path located in a disk having a remaining storage capacity greater than the size of the mirror image file as the storage path of the mirror image file includes:

selecting, by a user, from paths other than the preset path, a path located in a disk having a remaining storage capacity greater than the size of the mirror image file as the storage path of the mirror image file.

In a second aspect, a folder one-key mounting device applied in a KVM is provided according to the disclosure. The device includes:

a folder size determining module, configured to determine a size of a target folder when a one-key mounting instruction for the target folder is obtained;

a file size determining module, configured to determine a size of a mirror image file based on the size of the target folder;

a storage path determining module, configured to determine a storage path of the mirror image file based on the size of the mirror image file;

a mirror image file generating module, configured to generate a target mirror image file corresponding to the target folder and the size of the mirror image file, and store the target mirror image file in a position corresponding to the storage path; and a mirror image file mounting module, configured to mount the target mirror image file to a server.

In a third aspect, a KVM including the above folder one-key mounting device is provided according to the disclosure.

In a fourth aspect, a folder one-key mounting apparatus is provided according to the disclosure. The apparatus includes a memory storing computer programs; and a processor configured to execute the computer programs to perform the above folder one-key mounting method.

In a fifth aspect, a computer readable storage medium storing computer programs is provided according to the disclosure. The computer programs, when executed by a processor, cause the processor to perform the above folder one-key mounting method.

According to the present disclosure, a size of a target folder is determined when a one-key mounting instruction for the target folder is obtained, a size of a mirror image file is determined based on the size of the target folder, a storage path of the mirror image file is determined based on the size of the mirror image file. It can be seen that, the size and the storage path of the mirror image file are determined by a background program automatically instead of being inputted by a user manually. In other words, in this application, it is avoided the operations in the conventional art of manually allocating the size and the storage path of the temporary mirror image file, which have high technical requirements and are complicated and error-prone, and are closely integrated with underlying technology. The operations of allocating the size and the storage path of the temporary mirror image file are automatically performed in the system, thereby greatly simplifying the user operation when the folder is mounted with KVM, decreasing misoperation of the user, and improving the user experience.

BRIEF DESCRIPTION OF THE DRAWINGS

In order to explain more clearly the embodiments of the present disclosure or the technical solutions in the conventional art, following is a brief introduction to the accompanying drawings used in the embodiments or the technical descriptions of the conventional art. Apparently, the drawings described below show only some embodiments of the present disclosure, and for those skilled in the field, other drawings can also be obtained from these drawings without any creative effort.

FIG. 2 is a flow chart of a folder one-key mounting method according to an embodiment of the present disclosure;

DETAILED DESCRIPTION OF THE EMBODIMENTS

Following is a clear and complete description of the technical solutions of the present disclosure with reference to the accompanying drawings in the present disclosure. Apparently, the described embodiments are only some rather than all of the embodiments of the present disclosure. Based on the embodiments of the present disclosure, all other embodiments obtained by the skilled in the art without any creative effort fall within the scope of the present disclosure.

During a process of mounting a folder with KVM in the conventional technology, it is necessary for an operator to designate a size for a temporary mirror image file to be generated and to designate a local path to store the mirror image file, which is inconvenient to operate for a user and may easily result in errors in operation. According to the present disclosure, a size and a storage path of the mirror image file are determined by a background program automatically instead of being inputted by the user manually, thereby simplifying the user operation, decreasing misoperation of the user, and improving the user experience.

Figure 1:
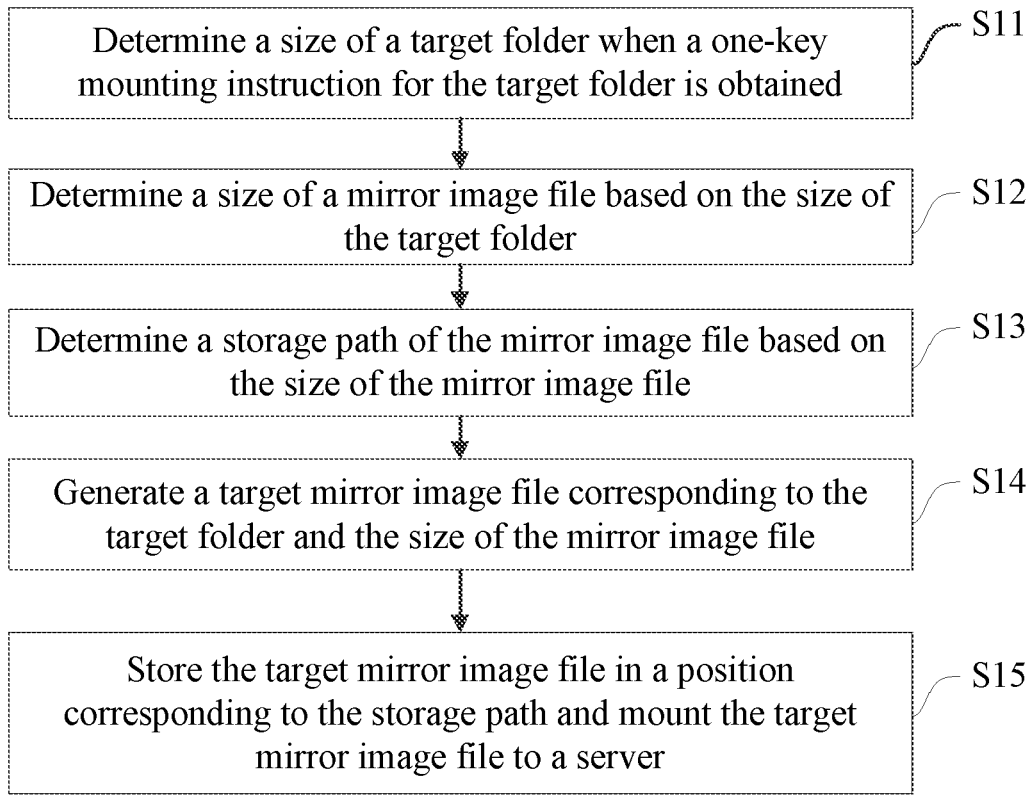
FIG. 1 is a flow chart of a folder one-key mounting method according to an embodiment of the present disclosure.

A folder one-key mounting method applied in a KVM is provided according to an embodiment of the present disclosure. As shown in FIG. 1, the method includes the following steps S11 to S15.

In step S11, a size of a target folder is determined when a one-key mounting instruction for the target folder is obtained.

It should be noted that, the one-key mounting instruction in the embodiment may be generated in many ways. In an embodiment, the one-key mounting instruction may be triggered manually, for example, it may be triggered by a user through a preset instruction triggering button. It is understood that, before the instruction is triggered by the user, it is necessary for the user to select a folder to be mounted as the target folder with a preset folder selecting interface. In another embodiment, the one-key mounting instruction may be triggered automatically by a background system, for example, it may be triggered automatically when a preset timer in background has counted for a preset time duration. It is understood that, before the preset time duration of the timer is set, the target folder should be selected manually by the user or automatically by the background system. Other feasible ways of generating the one-key mounting instruction may also be used in the embodiment of the present disclosure, which are not listed herein for simplicity.

In the embodiment, the size of the target folder is determined after the one-key mounting instruction for the target folder is obtained. In an embodiment, the size of the target folder is determined by adding up the size of all files in the target folder. In another embodiment, an information table is preset, an identifier of every folder and a size of every folder are recorded in the information table. In a case that the one-key mounting instruction for the target folder is obtained, the size of the target folder is determined by search the information table for the size of the target folder. It is understood that, when a variation of a file in any folder occurs, a variation of a size of the folder due to the variation of the file should be determined in a real time manner, and the information table is updated based on the variation of the size of the folder. Other feasible ways of determining the size of the target folder may also be used in the embodiment of the present disclosure, which are not listed herein for simplicity.

In step S12, a size of a mirror image file is determined based on the size of the target folder.

It should be understood that, in the embodiment, the size of the mirror image file determined in step S12 should be not less than the size of the target folder. That is, taking the size of the target folder as a reference, a parameter having a value not less than the size of the target folder is determined as the size of the mirror image file.

In the embodiment, the size of the mirror image file determined in step S12 is a size of a mirror image file generated subsequently corresponding to the target folder.

In step S13, a storage path of the mirror image file is determined based on the size of the mirror image file.

It should be understood that, in the embodiment, the storage path determined in step S13 should be located in a disk having a remaining storage capacity greater than the size of the mirror image file. That is, a path located in a disk having a remaining storage capacity greater than the size of the mirror image file is determined as the storage path in step S13.

In the embodiment, a suitable path is selected as the storage path of the mirror image file from all paths based on the size of the mirror image file and information of the all paths. In order to improve the speed of determining the storage path, a specific path may be selected in advance as a preset path. When the size of the mirror image file is determined in step S12, it is determined whether a remaining storage capacity of a disk where the preset path is located is greater than the size of the mirror image file. And the preset path is determined as the storage path of the mirror image file if the remaining storage capacity of the disk where the preset path is located is greater than the size of the mirror image file.

It should be noted that, in the embodiment, generally, only one storage path of the mirror image file is determined based on the size of the mirror image file. In order to store the same mirror image file in positions corresponding to multiple different paths and mount the same mirror image file to multiple different servers, multiple storage paths of the mirror image file may be determined based on the size of the mirror image file in the embodiment. The number of the storage paths may be preset by the user or set by a background system automatically.

In step S14, a target mirror image file corresponding to the target folder and the size of the mirror image file is generated.

That is, the mirror image file corresponding to the target folder is generated in step S14. The size of the generated mirror image file is the same as the size of the mirror image file determined in step S12.

In step S15, the target mirror image file is stored in a position corresponding to the storage path, and the target mirror image file is mounted to a server.

It should be noted that, in a case that multiple storage paths of the mirror image file are determined based on the size of the mirror image file in step S13, step S15 includes: storing the target mirror image file in a position corresponding to each of the multiple storage paths, and mounting the target mirror image files stored in positions corresponding to the multiple storage paths to different servers respectively.

For example, in the embodiment, it is assumed that three storage paths of the mirror image file are determined based on the size of the mirror image file, then the target mirror image file is stored in positions corresponding to the three storage paths subsequently, and the target mirror image files stored in positions corresponding to the three storage paths are mounted to three different servers respectively. In this way, users of multiple servers may share the same mirror image file simultaneously.

It should be noted that, the KVM in the present disclosure may be operated in a Linux system. By utilizing a BMC (Baseboard Management Controller) in the Linux system, functions of the KVM may be accomplished.

It can be seen that, in the embodiment of the present disclosure, a size of a target folder is determined when a one-key mounting instruction for the target folder is obtained, a size of a mirror image file is determined based on the size of the target folder, a storage path of the mirror image file is determined based on the size of the mirror image file. It can be seen that, the size and the storage path of the mirror image file are determined by a background program automatically instead of being inputted by a user manually. In other words, in this application, it is avoided the operations in the conventional art of manually allocating the size and the storage path of the temporary mirror image file, which have high technical requirements and are complicated and error-prone, and are closely integrated with underlying technology. The operations of allocating the size and the storage path of the temporary mirror image file are automatically performed in the system, thereby greatly simplifying the user operation when the folder is mounted with KVM, decreasing misoperation of the user, and improving the user experience.

Reference is made to FIG. 2, which is a flow chart of a folder one-key mounting method according to an embodiment of the present disclosure. The method is applied to KVM, the method includes the following steps S21 to S26.

In step S21, when a one-key mounting instruction for the target folder is obtained, each file in the target folder is traversed to determine a size of each file, and the size of each file is accumulated to obtain the size of the target folder.

In the embodiment, every file in the target folder is traversed to determine the size of every file in the target folder. The size of the target folder is determined by summing up the size of every file in the target folder. GB (Gigabyte) is taken as a unit for measuring the size of the target folder.

Besides, other ways of determining the size of the target folder may also be applied, for example, the size of the target folder may be determined by searching a preset information table for the size of the target folder.

In step S22, a value of N is determined based on the size of the target folder with $2^N$GB being greater than or equal to the size of the target folder, $2^N$GB is determined as the size of the mirror image file, N is a non-negative integer.

In an embodiment, the determining a value of N based on the size of the target folder includes: determining the value of N to be 0 in a case that the size of the target folder is not greater than 1 GB; and determining the value of N to be a value meeting $2^{N-1}$ GB$<S \leq 2^N$GB in a case that the size of the target folder is greater than 1 GB, where S represents the size of the target folder. For example, if the size of the target folder is 2.6 GB, the value of N determined in the above manner is 2, and thus the size of the mirror image file is 4 GB.

In practice, the size of the target folder may be compared with $2^N$GB. The value of N starts from 0 and is increased by one for each time, until $2^N$GB is not less than the size of the target folder for the first time. $2^N$GB, which is not less than the size of the target folder for the first time, is determined as the size of the mirror image file.

In another embodiment, in order to improve the speed of determining the size of the mirror image file, the determining a value of N based on the size of the target folder may include: presetting a non-negative integer N1 based on experiences; determining whether $2^{N1}$ GB is not less than the size of the target folder after the size of the target folder is determined in step S21; determining the non-negative integer N1 as the value of N in a case that $2^{N1}$ GB is not less than the size of the target folder. For example, if a size of a folder to be mounted is generally about 3 GB according to experiences, then N1 is preset to be 2. When the size of the target folder is determined, it is determined whether $2^2$ GB is not less than the size of the target folder, that is, it is determined whether 4 GB is not less than the size of the target folder. 2 is determined as the value of N if 4 GB is not less than the size of the target folder.

In step S23, it is determined a remaining storage capacity of a disk where a preset path is located, and it is determined whether the remaining storage capacity of the disk where the preset path is located is greater than the size of the mirror image file.

In step S24, the preset path is determined as the storage path of the mirror image file, in a case that the remaining storage capacity of the disk where the preset path is located is greater than the size of the mirror image file. A path, located in a disk having a remaining storage capacity greater than the size of the mirror image file, is selected from paths other than the preset path as the storage path of the mirror image file, in a case that the remaining storage capacity of the disk where the preset path is located is not greater than the size of the mirror image file.

In the embodiment, in order to improve the speed of determining a storage path, a path is selected in advance to be a preset path. After the size of the mirror image file is determined, it is determined whether the remaining storage capacity of the disk where the preset path is located is greater than the size of the mirror image file. The preset path is determined as the storage path of the mirror image file, in a case that the remaining storage capacity of the disk where the preset path is located is greater than the size of the mirror image file. A suitable path is selected from paths other than the preset path as the storage path of the mirror image file, in a case that the remaining storage capacity of the disk where the preset path is located is not greater than the size of the mirror image file.

In the embodiment, the preset path is a home path of a current user.

In an embodiment, the selecting, from paths other than the preset path, a path located in a disk having a remaining storage capacity greater than the size of the mirror image file as the storage path of the mirror image file includes: selecting, by a user, from paths other than the preset path, a path located in a disk having a remaining storage capacity greater than the size of the mirror image file as the storage path of the mirror image file.

That is, if the remaining storage capacity of the disk where the preset path is located is not greater than the size of the mirror image file, the storage path of the mirror image file may be selected by the user. It should be understood that, before the storage path is selected by the user, a prompt dialog box may be popped up on a user interface, to prompt the user to input path selecting information through a preset input interface.

In another embodiment, the selecting, from paths other than the preset path, a path located in a disk having a remaining storage capacity greater than the size of the mirror image file as the storage path of the mirror image file includes: selecting, by a background program, a suitable path from paths other than the preset path as the storage path of the mirror image file based on the size of the mirror image file and information of each one of the paths other than the preset path, where the information of the path includes but is not limited to a secret level and a historical access frequency of the path.

In step S25, a target mirror image file corresponding to the target folder and the size of the mirror image file is generated.

In step S26, the target mirror image file is stored in a position corresponding to the storage path, and the target mirror image file is mounted to a server.

Figure 3:
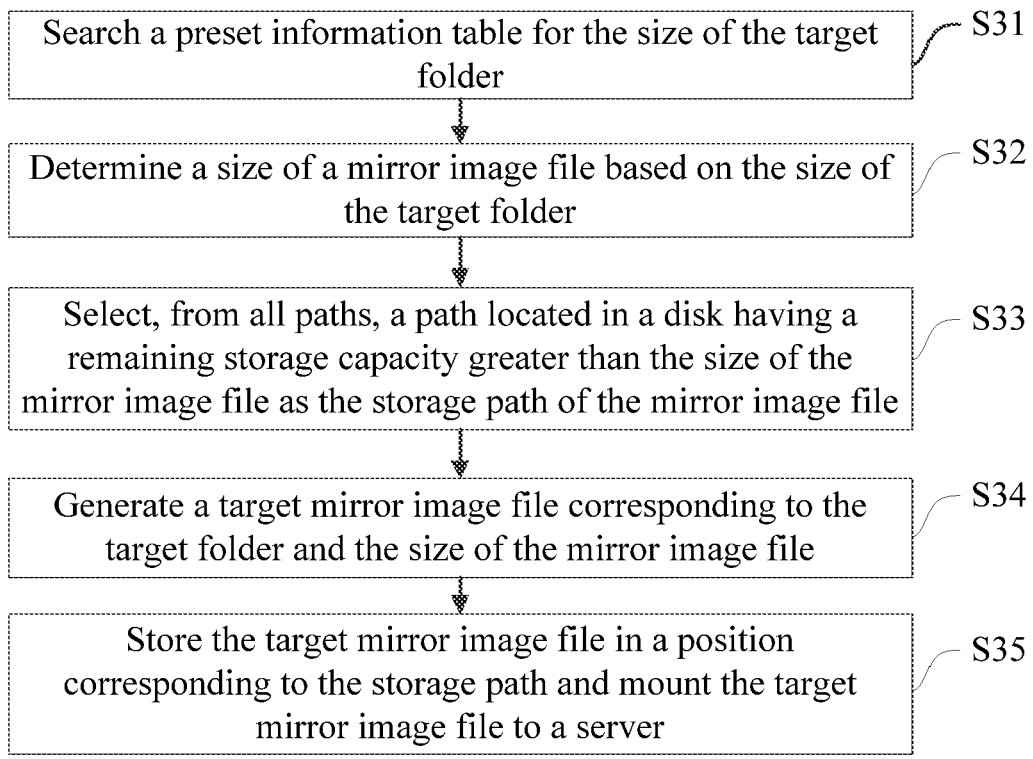
FIG. 3 is a flow chart of a folder one-key mounting method according to an embodiment of the present disclosure.

As shown in FIG. 3, a folder one-key mounting method applied in a KVM is provided in an embodiment of the present disclosure. The method includes the following steps S31 to S35.

In step S31, a preset information table is searched for the size of the target folder. The preset information table stores in advance an identifier of each folder and a size of each folder.

In the embodiment, in order to ensure a high time-effectiveness of the information table, the folder one-key mounting method may further include: monitoring a variation of a file in each folder in a real time manner; and when a variation of a file in a folder occurs, collecting variation information of the file and updating the information table based on the variation information of the file.

In step S32, a size of a mirror image file is determined based on the size of the target folder.

The detailed process of step S32 may be found in corresponding descriptions of the above embodiments, which will not be described again for simplicity.

In step S33, a path located in a disk having a remaining storage capacity greater than the size of the mirror image file is selected from all paths as the storage path of the mirror image file.

Figure 4:
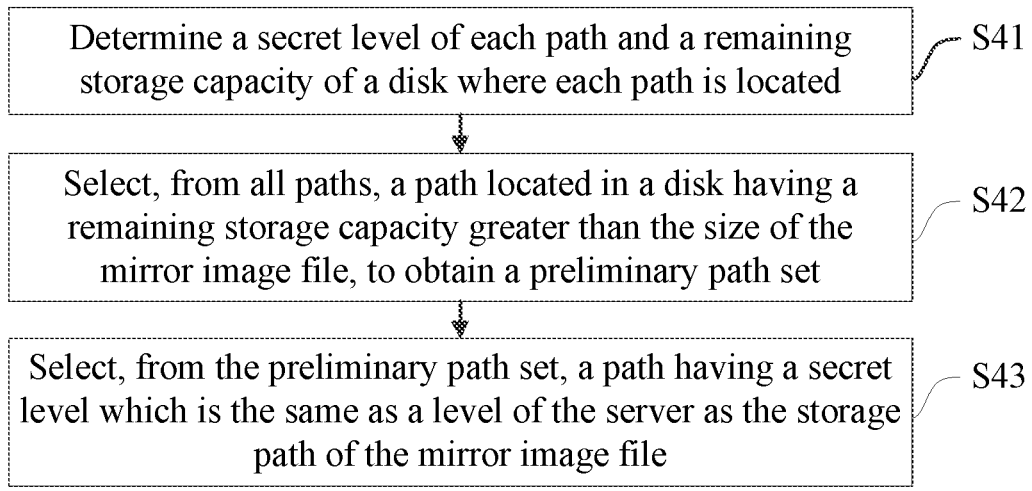
FIG. 4 is a flow chart of some steps of a folder one-key mounting method according to an embodiment of the present disclosure.

In a first implementation, since secret levels of different paths are different and levels of different servers are different, in order to avoid a path with a high secret level being browsed by a server with a low level, as shown in FIG. 4, the operation of selecting, from all paths, a path located in a disk having a remaining storage capacity greater than the size of the mirror image file as the storage path of the mirror image file may include steps S41 to S43.

In step S41, it is determined a secret level of each path and a remaining storage capacity of a disk where each path is located.

In step S42, a path located in a disk having a remaining storage capacity greater than the size of the mirror image file is selected from all paths to obtain a preliminary path set.

In step S43, a path having a secret level which is the same as a level of the server is selected from the preliminary path set as the storage path of the mirror image file.

It should be understood that, in the embodiment, one or more paths having a secret level which is the same as a level of the server may be selected from the preliminary path set as the storage path of the mirror image file, according to actual situations.

Figure 5:
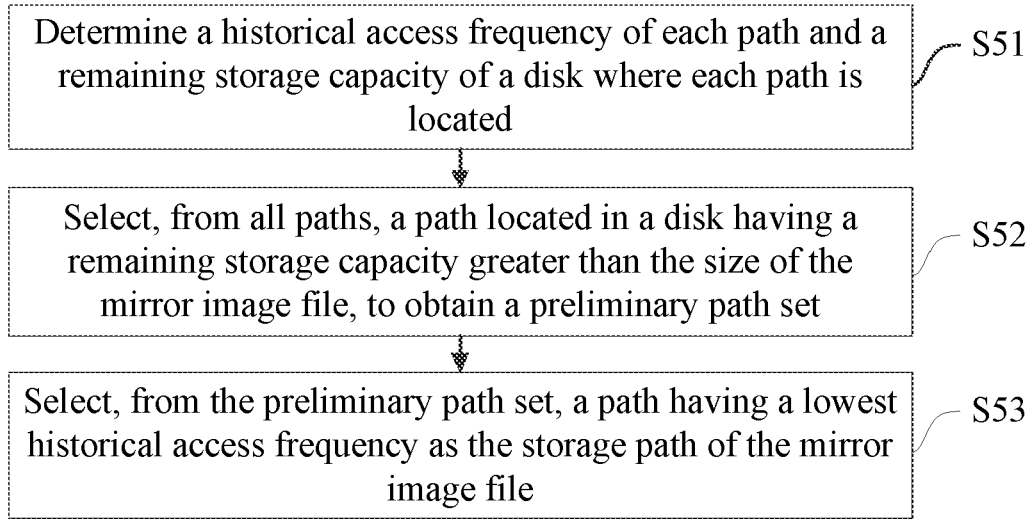
FIG. 5 is a flow chart of some steps of a folder one-key mounting method according to an embodiment of the present disclosure.

In a second implementation, since historical access frequencies of different paths are different, in order to avoid some paths being not accessed for a long time, in this embodiment, as shown in FIG. 5, the operation of selecting, from all paths, a path located in a disk having a remaining storage capacity greater than the size of the mirror image file as the storage path of the mirror image file may include steps S51 to S53.

In step S51, a historical access frequency of each path is determined and a remaining storage capacity of a disk where each path is located is determined.

In step S52, a path located in a disk having a remaining storage capacity greater than the size of the mirror image file is selected from all paths to obtain a preliminary path set.

In step S53, a path having a lowest historical access frequency is selected from the preliminary path set as the storage path of the mirror image file.

It should be understood that, in the embodiment, one or more paths having a lowest historical access frequency may be selected from the preliminary path set as the storage path of the mirror image file, according to actual situations.

Figure 6:
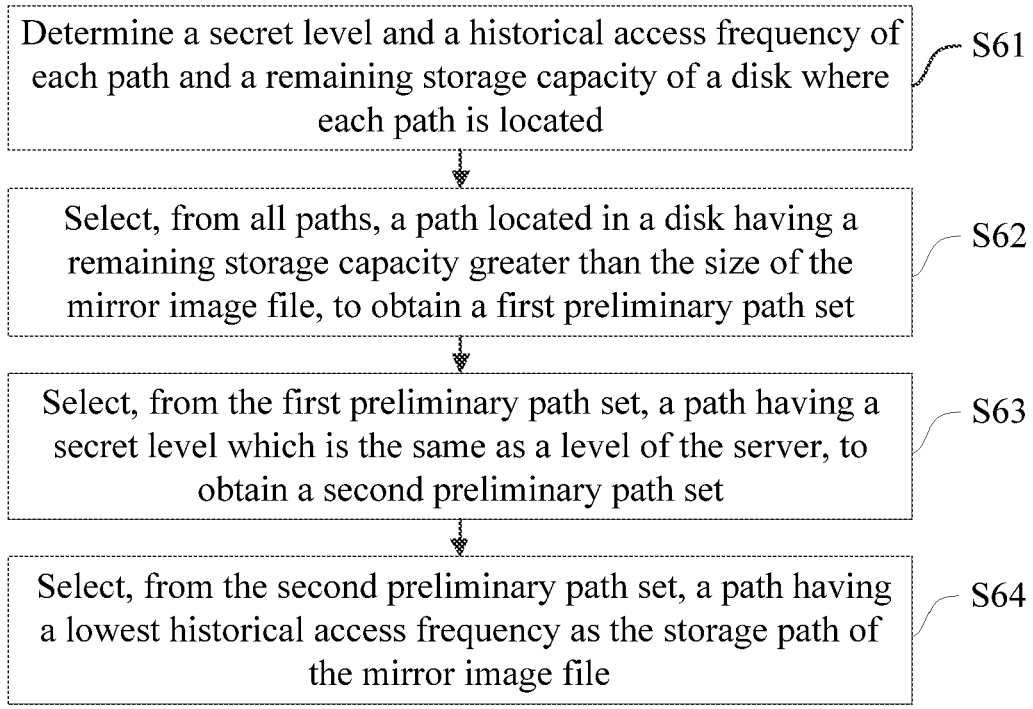
FIG. 6 is a flow chart of some steps of a folder one-key mounting method according to an embodiment of the present disclosure.

In a third implementation, as shown in FIG. 6, the operation of selecting, from all paths, a path located in a disk having a remaining storage capacity greater than the size of the mirror image file as the storage path of the mirror image file may include steps S61 to S64.

In step S61, it is determined a secret level and a historical access frequency of each path and a remaining storage capacity of a disk where each path is located.

In step S62, a path located in a disk having a remaining storage capacity greater than the size of the mirror image file is selected from all paths, to obtain a first preliminary path set.

In step S63, a path having a secret level which is the same as a level of the server is selected from the first preliminary path set, to obtain a second preliminary path set.

In step S64, a path having a lowest historical access frequency is selected from the second preliminary path set as the storage path of the mirror image file.

It should be understood that, in the embodiment, one or more paths having a lowest historical access frequency may be selected from the second preliminary path set as the storage path of the mirror image file, according to actual situations.

In step S34, a target mirror image file corresponding to the target folder and the size of the mirror image file is generated.

In step S35, the target mirror image file is stored in a position corresponding to the storage path, and the target mirror image file is mounted to a server.

Figure 7:
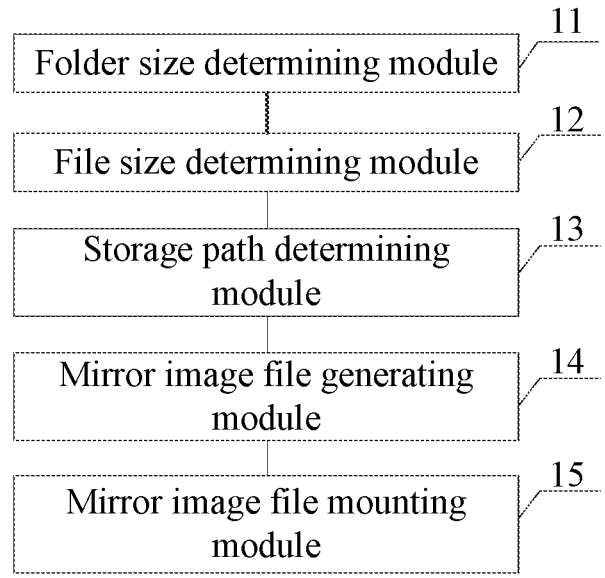
FIG. 7 is a schematic structural diagram of a folder one-key mounting device according to an embodiment of the present disclosure.

As shown in FIG. 7, a folder one-key mounting device applied in a KVM is provided according to the embodiment of the disclosure. The device includes a folder size determining module 11, a file size determining module 12, a storage path determining module 13, a mirror image file generating module 14 and a mirror image file mounting module 15.

The folder size determining module 11 is configured to determine a size of a target folder when a one-key mounting instruction for the target folder is obtained, The file size determining module 12 is configured to determine a size of a mirror image file based on the size of the target folder.

The storage path determining module 13 is configured to determine a storage path of the mirror image file based on the size of the mirror image file.

The mirror image file generating module 14 is configured to generate a target mirror image file corresponding to the target folder and the size of the mirror image file, and store the target mirror image file in a position corresponding to the storage path.

The mirror image file mounting module 15 is configured to mount the target mirror image file to a server.

It can be seen that, according to the embodiment of the present disclosure, the size and the storage path of the mirror image file are determined by a background program automatically instead of being inputted by a user manually. In other words, in this application, it is avoided the operations in the conventional art of manually allocating the size and the storage path of the temporary mirror image file, which have high technical requirements and are complicated and error-prone, and are closely integrated with underlying technology. The operations of allocating the size and the storage path of the temporary mirror image file are automatically performed in the system, thereby greatly simplifying the user operation when the folder is mounted with KVM, decreasing misoperation of the user, and improving the user experience.

In an embodiment, the folder size determining module 11 includes a traversing unit and an accumulating unit. The traversing unit is configured to traverse each file in the target folder, to determine a size of each file. The accumulating unit is configured to accumulate the size of each file, to obtain the size of the target folder.

In an embodiment, the folder size determining module 11 is configured to search a preset information table for the size of the target folder, where the preset information table stores in advance an identifier of each folder and a size of each folder.

In an embodiment, the folder one-key mounting device further includes an information table updating module. The information table updating module is configured to: monitor a variation of a file in each folder in a real time manner; and when a variation of a file in a folder occurs, collect variation information of the file and update the information table based on the variation information of the file.

In an embodiment, the file size determining module 12 is configured to: determine a value of N based on the size of the target folder with $2^N$ GB being greater than or equal to the size of the target folder, where N is a non-negative integer; and determine $2^N$ GB as the size of the mirror image file.

In an embodiment, the file size determining module 12 is configured to: determine the value of N to be 0 in a case that the size of the target folder is not greater than 1 GB; and determine the value of N to be a value meeting $2^{N-1}$ GB$<S\leq 2^N$GB in a case that the size of the target folder is greater than 1 GB, where S represents the size of the target folder.

In an embodiment, the storage path determining module 13 is configured to determine multiple storage paths of the mirror image file based on the size of the mirror image file. Correspondingly, the mirror image file generating module 14 is configured to generate a target mirror image file corresponding to the target folder and the size of the mirror image file, and store the target mirror image file in a position corresponding to each of the multiple storage paths. The mirror image file mounting module 15 is configured to mount the target mirror image files stored in positions corresponding to the multiple storage paths to different servers respectively.

In an embodiment, the storage path determining module 13 is configured to select, from all paths, a path located in a disk having a remaining storage capacity greater than the size of the mirror image file as the storage path of the mirror image file.

In an embodiment, the storage path determining module 13 includes a first determining unit, a first selecting unit and a second selecting unit. The first determining unit is configured to determine a secret level of each path and a remaining storage capacity of a disk where each path is located. The first selecting unit is configured to select, from all paths, a path located in a disk having a remaining storage capacity greater than the size of the mirror image file, to obtain a preliminary path set. The second selecting unit is configured to select, from the preliminary path set, a path having a secret level which is the same as a level of the server as the storage path of the mirror image file.

In an embodiment, the storage path determining module 13 includes a second determining unit, a third selecting unit and a fourth selecting unit. The second determining unit is configured to determine a historical access frequency of each path and a remaining storage capacity of a disk where each path is located. The third selecting unit is configured to select, from all paths, a path located in a disk having a remaining storage capacity greater than the size of the mirror image file, to obtain a preliminary path set. The fourth selecting unit is configured to select, from the preliminary path set, a path having a lowest historical access frequency as the storage path of the mirror image file.

In an embodiment, the storage path determining module 13 includes a third determining unit, a fifth selecting unit, a sixth selecting unit and a seventh selecting unit. The third determining unit is configured to determining a secret level and a historical access frequency of each path and a remaining storage capacity of a disk where each path is located. The fifth selecting unit is configured to select, from all paths, a path located in a disk having a remaining storage capacity greater than the size of the mirror image file, to obtain a first preliminary path set. The sixth selecting unit is configured to select, from the first preliminary path set, a path having a secret level which is the same as a level of the server, to obtain a second preliminary path set. The seventh selecting unit is configured to select, from the second preliminary path set, a path having a lowest historical access frequency as the storage path of the mirror image file.

In an embodiment, the storage path determining module 13 includes a remaining storage capacity determining unit, a judging unit, a path determining unit and an eighth selecting unit. The remaining storage capacity determining unit is configured to determine a remaining storage capacity of a disk where a preset path is located. The judging unit is configured to determine whether the remaining storage capacity of the disk where the preset path is located is greater than the size of the mirror image file. The path determining unit is configured to determine the preset path as the storage path of the mirror image file in a case that the judging unit determines that the remaining storage capacity of the disk where the preset path is located is greater than the size of the mirror image file. The eighth selecting unit is configured to select, from paths other than the preset path, a path located in a disk having a remaining storage capacity greater than the size of the mirror image file as the storage path of the mirror image file, in a case that the judging unit determines that the remaining storage capacity of the disk where the preset path is located is not greater than the size of the mirror image file.

In an embodiment, the preset path is a home path of a current user.

In an embodiment, the eighth selecting unit is configured to select, by a user, from paths other than the preset path, a path located in a disk having a remaining storage capacity greater than the size of the mirror image file as the storage path of the mirror image file.

Further, a KVM is provided by the present disclosure. The KVM includes the folder one-key mounting device as described in the above embodiments. For detailed configuration and function of the folder one-key mounting device, corresponding descriptions in the above embodiment may be referred to, which will not listed again herein for simplicity. In addition, the KVM may be operated in a Linux system, and the functions of the KVM may be realized by utilizing BMC in the Linux system.

Figure 8:
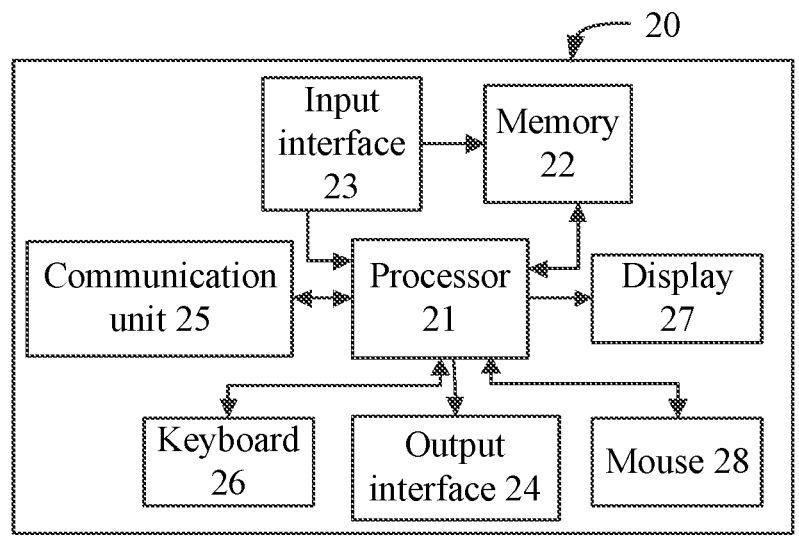
FIG. 8 is a schematic structural diagram of a folder one-key mounting apparatus according to an embodiment of the present disclosure.

As shown in FIG. 8, a folder one-key mounting apparatus 20 is provided according to an embodiment of the disclosure. The apparatus includes a memory 22 and a processor 21. The processor 21 is configured to execute computer programs stored in the memory 22 to: determine a size of a target folder when a one-key mounting instruction for the target folder is obtained; determine a size of a mirror image file based on the size of the target folder; determine a storage path of the mirror image file based on the size of the mirror image file; generate a target mirror image file corresponding to the target folder and the size of the mirror image file, and storing the target mirror image file in a position corresponding to the storage path; and mount the target mirror image file to a server.

It can be seen that, according to the embodiment of the present disclosure, the size and the storage path of the mirror image file are determined by a background program automatically instead of being inputted by a user manually. In other words, in this application, it is avoided the operations in the conventional art of manually allocating the size and the storage path of the temporary mirror image file, which have high technical requirements and are complicated and error-prone, and are closely integrated with underlying technology. The operations of allocating the size and the storage path of the temporary mirror image file are automatically performed in the system, thereby greatly simplifying the user operation when the folder is mounted with KVM, decreasing misoperation of the user, and improving the user experience.

In an embodiment, the processor 21 is configured to execute computer programs stored in the memory 22 to: traverse each file in the target folder, to determine a size of each file; and accumulate the size of each file, to obtain the size of the target folder.

In an embodiment, the processor 21 is configured to execute computer programs stored in the memory 22 to: search a preset information table for the size of the target folder, where the preset information table stores in advance an identifier of each folder and a size of each folder.

In an embodiment, the processor 21 is configured to execute computer programs stored in the memory 22 to: monitor a variation of a file in each folder in a real time manner; and when a variation of a file in a folder occurs, collect variation information of the file and update the information table based on the variation information of the file.

In an embodiment, the processor 21 is configured to execute computer programs stored in the memory 22 to: determine a value of N based on the size of the target folder with $2^N$GB being greater than or equal to the size of the target folder, where N is a non-negative integer; and determine $2^N$GB as the size of the mirror image file.

In an embodiment, the processor 21 is configured to execute computer programs stored in the memory 22 to: determine the value of N to be 0 in a case that the size of the target folder is not greater than 1 GB; and determine the value of N to be a value meeting $2^{N-1}$ GB$<$S$\leq 2^N$GB in a case that the size of the target folder is greater than 1 GB, where S represents the size of the target folder.

In an embodiment, the processor 21 is configured to execute computer programs stored in the memory 22 to: determine multiple storage paths of the mirror image file based on the size of the mirror image file; and store the target mirror image file in a position corresponding to each of the multiple storage paths, and mount the target mirror image files stored in positions corresponding to the multiple storage paths to different servers respectively.

In an embodiment, the processor 21 is configured to execute computer programs stored in the memory 22 to: select, from all paths, a path located in a disk having a remaining storage capacity greater than the size of the mirror image file as the storage path of the mirror image file.

In an embodiment, the processor 21 is configured to execute computer programs stored in the memory 22 to: determine a secret level of each path and a remaining storage capacity of a disk where each path is located; select, from all paths, a path located in a disk having a remaining storage capacity greater than the size of the mirror image file, to obtain a preliminary path set; and select, from the preliminary path set, a path having a secret level which is the same as a level of the server as the storage path of the mirror image file.

In an embodiment, the processor 21 is configured to execute computer programs stored in the memory 22 to: determine a historical access frequency of each path and a remaining storage capacity of a disk where each path is located; select, from all paths, a path located in a disk having a remaining storage capacity greater than the size of the mirror image file, to obtain a preliminary path set; and select, from the preliminary path set, a path having a lowest historical access frequency as the storage path of the mirror image file.

In an embodiment, the processor 21 is configured to execute computer programs stored in the memory 22 to: determine a secret level and a historical access frequency of each path and a remaining storage capacity of a disk where each path is located; select, from all paths, a path located in a disk having a remaining storage capacity greater than the size of the mirror image file, to obtain a first preliminary path set; select, from the first preliminary path set, a path having a secret level which is the same as a level of the server, to obtain a second preliminary path set; and select, from the second preliminary path set, a path having a lowest historical access frequency as the storage path of the mirror image file.

In an embodiment, the processor 21 is configured to execute computer programs stored in the memory 22 to: determine a remaining storage capacity of a disk where a preset path is located; determine whether the remaining storage capacity of the disk where the preset path is located is greater than the size of the mirror image file; determine the preset path as the storage path of the mirror image file in a case that the remaining storage capacity of the disk where the preset path is located is greater than the size of the mirror image file; and select, from paths other than the preset path, a path located in a disk having a remaining storage capacity greater than the size of the mirror image file as the storage path of the mirror image file, in a case that the remaining storage capacity of the disk where the preset path is located is not greater than the size of the mirror image file. The preset path is a home path of a current user.

In an embodiment, the processor 21 is configured to execute computer programs stored in the memory 22 to: select, by a user, from paths other than the preset path, a path located in a disk having a remaining storage capacity greater than the size of the mirror image file as the storage path of the mirror image file.

Further, the folder one-key mounting apparatus 20 in the embodiment further includes an input interface 23, an output interface 24, a communication unit 25, a keyboard 26, a display 27 and a mouse 28.

The input interface 23 is configured to obtain inputted computer programs, store the computer programs to the memory 22, obtain an instruction and a parameter transmitted from an external device, and transmit the instruction and the parameter to the processor 21. Processing is then performed by the processor 21 based on the instruction and the parameter. In the embodiment, the input interface 23 may include but be not limited to a USB interface, a serial interface, a voice input interface, a fingerprint input interface, a hard disk reading interface, and the like.

The output interface 24 is configured to output all kinds of data generated by the processor 21 to a terminal device connected with the output interface 24. Thus the terminal device connected with the output interface 24 may obtain the all kinds of data generated by the processor 21. In the embodiment, the output interface 24 may include but be not limited to a USB interface, a serial interface, and the like.

The communication unit 25 is configured to establish a communication connection between the folder one-key mounting apparatus 20 and an external server, to facilitate the folder one-key mounting apparatus 20 to mount the mirror image file to the external server. In the embodiment, the communication unit 25 may include but be not limited to a communication unit based on a wireless communication technology or a wired communication technology.

The keyboard 26 is configured to obtain all kinds of parameters or instructions inputted by a user by means of taping a keycap in real time.

The display 27 is configured to display relative information during the process of mounting a folder in a real time manner, to facilitate the user to know the current situations of the folder being mounted.

The mouse 28 is configured to facilitate the user to input data and simplify the user's operation. With the keyboard 26, the display 27 and the mouse 28 together with KVM technology, a system administrator may perform switch management, remote control and folder mounting on multiple host computers efficiently.

Further, a computer readable storage medium storing computer programs is provided in an embodiment of the present disclosure. The computer programs, when executed by a processor, cause the processor to: determine a size of a target folder when a one-key mounting instruction for the target folder is obtained; determine a size of a mirror image file based on the size of the target folder; determine a storage path of the mirror image file based on the size of the mirror image file; generate a target mirror image file corresponding to the target folder and the size of the mirror image file, and storing the target mirror image file in a position corresponding to the storage path; and mount the target mirror image file to a server.

It can be seen that, according to the embodiment of the present disclosure, the size and the storage path of the mirror image file are determined by a background program automatically instead of being inputted by a user manually. In other words, in this application, it is avoided the operations in the conventional art of manually allocating the size and the storage path of the temporary mirror image file, which have high technical requirements and are complicated and error-prone, and are closely integrated with underlying technology. The operations of allocating the size and the storage path of the temporary mirror image file are automatically performed in the system, thereby greatly simplifying the user operation when the folder is mounted with KVM, decreasing misoperation of the user, and improving the user experience.

In an embodiment, the computer programs stored in the computer readable storage medium, when executed by a processor, cause the processor to: traverse each file in the target folder, to determine a size of each file; and accumulate the size of each file, to obtain the size of the target folder.

In an embodiment, the computer programs stored in the computer readable storage medium, when executed by a processor, cause the processor to: search a preset information table for the size of the target folder, where the preset information table stores in advance an identifier of each folder and a size of each folder.

In an embodiment, the computer programs stored in the computer readable storage medium, when executed by a processor, cause the processor to: monitor a variation of a file in each folder in a real time manner; and when a variation of a file in a folder occurs, collect variation information of the file and update the information table based on the variation information of the file.

In an embodiment, the computer programs stored in the computer readable storage medium, when executed by a processor, cause the processor to: determine a value of N based on the size of the target folder with $2^N$GB being greater than or equal to the size of the target folder, where N is a non-negative integer; and determine $2^N$GB as the size of the mirror image file.

In an embodiment, the computer programs stored in the computer readable storage medium, when executed by a processor, cause the processor to: determine the value of N to be 0 in a case that the size of the target folder is not greater than 1 GB; and determine the value of N to be a value meeting $2^{N-1}$ GB$<$S$\leq 2^N$GB in a case that the size of the target folder is greater than 1 GB, where S represents the size of the target folder.

In an embodiment, the computer programs stored in the computer readable storage medium, when executed by a processor, cause the processor to: determine multiple storage paths of the mirror image file based on the size of the mirror image file; and store the target mirror image file in a position corresponding to each of the multiple storage paths, and mount the target mirror image files stored in positions corresponding to the multiple storage paths to different servers respectively.

In an embodiment, the computer programs stored in the computer readable storage medium, when executed by a processor, cause the processor to: select, from all paths, a path located in a disk having a remaining storage capacity greater than the size of the mirror image file as the storage path of the mirror image file.

In an embodiment, the computer programs stored in the computer readable storage medium, when executed by a processor, cause the processor to: determine a secret level of each path and a remaining storage capacity of a disk where each path is located; select, from all paths, a path located in a disk having a remaining storage capacity greater than the size of the mirror image file, to obtain a preliminary path set; and select, from the preliminary path set, a path having a secret level which is the same as a level of the server as the storage path of the mirror image file.

In an embodiment, the computer programs stored in the computer readable storage medium, when executed by a processor, cause the processor to: determine a historical access frequency of each path and a remaining storage capacity of a disk where each path is located; select, from all paths, a path located in a disk having a remaining storage capacity greater than the size of the mirror image file, to obtain a preliminary path set; and select, from the preliminary path set, a path having a lowest historical access frequency as the storage path of the mirror image file.

In an embodiment, the computer programs stored in the computer readable storage medium, when executed by a processor, cause the processor to: determine a secret level and a historical access frequency of each path and a remaining storage capacity of a disk where each path is located; select, from all paths, a path located in a disk having a remaining storage capacity greater than the size of the mirror image file, to obtain a first preliminary path set; select, from the first preliminary path set, a path having a secret level which is the same as a level of the server, to obtain a second preliminary path set; and select, from the second preliminary path set, a path having a lowest historical access frequency as the storage path of the mirror image file.

In an embodiment, the computer programs stored in the computer readable storage medium, when executed by a processor, cause the processor to: determine a remaining storage capacity of a disk where a preset path is located; determine whether the remaining storage capacity of the disk where the preset path is located is greater than the size of the mirror image file; determine the preset path as the storage path of the mirror image file in a case that the remaining storage capacity of the disk where the preset path is located is greater than the size of the mirror image file; and select, from paths other than the preset path, a path located in a disk having a remaining storage capacity greater than the size of the mirror image file as the storage path of the mirror image file, in a case that the remaining storage capacity of the disk where the preset path is located is not greater than the size of the mirror image file. The preset path is a home path of a current user.

In an embodiment, the computer programs stored in the computer readable storage medium, when executed by a processor, cause the processor to: select, by a user, from paths other than the preset path, a path located in a disk having a remaining storage capacity greater than the size of the mirror image file as the storage path of the mirror image file.

The embodiments in this specification are all described in a progressive manner. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

The person skilled in the art can further appreciate that the elements and algorithm steps of each embodiment described in connection with the embodiments disclosed herein can be implemented in electronic hardware, computer software or a combination of both, in order to clearly illustrate the interchangeability of the hardware and software, the composition and steps of the various examples have been generally described in terms of function in the above description. Whether these functions are performed in hardware or software depends on the specific application and design constraints of the technical solution. The person skilled in the art can use different methods for implementing the described functions for each particular application, such implementation should not be considered to be beyond the scope of the present disclosure.

The steps of the method or algorithm described in connection with the embodiments disclosed herein may be implemented directly in hardware, software modules executed by a processor, or a combination of both. The software module can be placed in random access memory (RAM), memory, read only memory (ROM), electrically programmable ROM, electrically erasable programmable ROM, registers, hard disk, removable disk, CD-ROM, or any other form of storage medium known in technical field.

It should be further noted that, the relationship terminologies such as "first", "second" and the like are only used herein to distinguish one entity or operation from another, rather than to necessitate or imply that the actual relationship or order exists between the entities or operations. Further, the term "include", "comprise" or any variant thereof is intended to encompass nonexclusive inclusion so that a process, method, article or device including a series of elements includes not only those elements but also other elements which have not been listed definitely or an element(s) inherent to the process, method, article or device. Moreover, the expression "comprising a(n) . . . " in which an element is defined will not preclude presence of an additional identical element(s) in a process, method, article or device including the defined element(s) unless further defined.

The KVM, the folder one-key mounting method, the folder one-key mounting device, the folder one-key mounting apparatus and the medium applied in the KVM provided by the present disclosure are described in detail above. The principles and implementations of the present disclosure are described herein with specific embodiments. The above description of embodiments is only intended to help the understanding of the method and the concept of the present disclosure. For those skilled in the art, modification can be made to the specific embodiments and the application scopes based on the concept of the present disclosure, therefore, the specification should not be understood to limit the present disclosure.

The invention claimed is:

1. A folder one-key mounting method applied in a Keyboard Video Mouse (KVM), the method comprising:
   determining a size of a target folder when a one-key mounting instruction for the target folder is obtained;
   determining a size of a mirror image file based on the size of the target folder;
   determining a storage path of the mirror image file based on the size of the mirror image file;
   generating a target mirror image file corresponding to the target folder and the size of the mirror image file, and storing the target mirror image file in a position corresponding to the storage path; and
mounting the target mirror image file to a server.

2. The folder one-key mounting method according to claim 1, wherein the determining a size of a target folder comprises:
traversing each file in the target folder, to determine a size of each file; and
accumulating the size of each file, to obtain the size of the target folder.

3. The folder one-key mounting method according to claim 1, wherein the determining a size of a target folder comprises:
searching a preset information table for the size of the target folder, wherein the preset information table stores in advance an identifier of each folder and a size of each folder.

4. The folder one-key mounting method according to claim 3, further comprising:
monitoring a variation of a file in each folder in a real time manner; and
when a variation of a file in a folder occurs, collecting variation information of the file and updating the information table based on the variation information of the file.

5. The folder one-key mounting method according to claim 1, wherein the determining a size of a mirror image file based on the size of the target folder comprises:
determining a value of N based on the size of the target folder with $2^N$GB being greater than or equal to the size of the target folder, wherein N is a non-negative integer; and
determining $2^N$GB as the size of the mirror image file.

6. The folder one-key mounting method according to claim 5, wherein the determining a value of N based on the size of the target folder comprises:
determining the value of N to be 0 in a case that the size of the target folder is not greater than 1 GB; and
determining the value of N to be a value meeting $2^{N-1}GB<S\leq 2^N GB$ in a case that the size of the target folder is greater than 1 GB, wherein S represents the size of the target folder.

7. The folder one-key mounting method according to claim 1, wherein
the determining a storage path of the mirror image file based on the size of the mirror image file comprises:
determining a plurality of storage paths of the mirror image file based on the size of the mirror image file; and
the storing the target mirror image file in a position corresponding to the storage path and mounting the target mirror image file to a server comprises:
storing the target mirror image file in a position corresponding to each of the plurality of storage paths, and mounting the target mirror image files stored in positions corresponding to the plurality of storage paths to different servers respectively.

8. The folder one-key mounting method according to claim 1, wherein the determining a storage path of the mirror image file based on the size of the mirror image file comprises:
selecting, from all paths, a path located in a disk having a remaining storage capacity greater than the size of the mirror image file as the storage path of the mirror image file.

9. The folder one-key mounting method according to claim 8, wherein the selecting, from all paths, a path located in a disk having a remaining storage capacity greater than the size of the mirror image file as the storage path of the mirror image file comprises:
determining a secret level of each path and a remaining storage capacity of a disk where each path is located;
selecting, from all paths, a path located in a disk having a remaining storage capacity greater than the size of the mirror image file, to obtain a preliminary path set; and
selecting, from the preliminary path set, a path having a secret level which is the same as a level of the server as the storage path of the mirror image file.

10. The folder one-key mounting method according to claim 8, wherein the selecting, from all paths, a path located in a disk having a remaining storage capacity greater than the size of the mirror image file as the storage path of the mirror image file comprises:
determining a historical access frequency of each path and a remaining storage capacity of a disk where each path is located;
selecting, from all paths, a path located in a disk having a remaining storage capacity greater than the size of the mirror image file, to obtain a preliminary path set; and
selecting, from the preliminary path set, a path having a lowest historical access frequency as the storage path of the mirror image file.

11. The folder one-key mounting method according to claim 8, wherein the selecting, from all paths, a path located in a disk having a remaining storage capacity greater than the size of the mirror image file as the storage path of the mirror image file comprises:
determining a secret level and a historical access frequency of each path and a remaining storage capacity of a disk where each path is located;
selecting, from all paths, a path located in a disk having a remaining storage capacity greater than the size of the mirror image file, to obtain a first preliminary path set;
selecting, from the first preliminary path set, a path having a secret level which is the same as a level of the server, to obtain a second preliminary path set; and
selecting, from the second preliminary path set, a path having a lowest historical access frequency as the storage path of the mirror image file.

12. The folder one-key mounting method according to claim 1, wherein the determining a storage path of the mirror image file based on the size of the mirror image file comprises:
determining a remaining storage capacity of a disk where a preset path is located;
determining whether the remaining storage capacity of the disk where the preset path is located is greater than the size of the mirror image file;
determining the preset path as the storage path of the mirror image file in a case that the remaining storage capacity of the disk where the preset path is located is greater than the size of the mirror image file; and
selecting, from paths other than the preset path, a path located in a disk having a remaining storage capacity greater than the size of the mirror image file as the storage path of the mirror image file, in a case that the remaining storage capacity of the disk where the preset path is located is not greater than the size of the mirror image file.

13. The folder one-key mounting method according to claim 12, wherein the preset path is a home path of a current user.

14. The folder one-key mounting method according to claim 12, wherein the selecting, from paths other than the preset path, a path located in a disk having a remaining storage capacity greater than the size of the mirror image file as the storage path of the mirror image file comprises:
  selecting, by a user, from paths other than the preset path, a path located in a disk having a remaining storage capacity greater than the size of the mirror image file as the storage path of the mirror image file.

15. A folder one-key mounting apparatus comprising:
  a memory storing computer programs; and
  a processor configured to execute the computer programs to perform the folder one-key mounting method according to claim 1.

16. A Keyboard Video Mouse (KVM), comprising the folder one-key mounting apparatus according to claim 15.

17. A non-transitory computer readable storage medium storing computer programs, wherein the computer programs, when executed by a processor, cause the processor to perform a folder one-key mounting method applied in a Keyboard Video Mouse (KVM), the method comprises:
  determining a size of a target folder when a one-key mounting instruction for the target folder is obtained;
  determining a size of a mirror image file based on the size of the target folder;
  determining a storage path of the mirror image file based on the size of the mirror image file;
  generating a target mirror image file corresponding to the target folder and the size of the mirror image file, and storing the target mirror image file in a position corresponding to the storage path; and
  mounting the target mirror image file to a server.

* * * * *